(12) United States Patent
Imrem et al.

(10) Patent No.: US 12,260,307 B2
(45) Date of Patent: Mar. 25, 2025

(54) APPARATUS AND A METHOD FOR DIGITAL ASSET MAP GENERATION

(71) Applicant: Duo Dimensio, LLC, Bloomington, IN (US)

(72) Inventors: David Imrem, Bloomington, IN (US); Reuben Vandeventer, Bloomington, IN (US)

(73) Assignee: Duo Dimensio, LLC, Bloomington, IN (US)

( * ) Notice: Subject to any disclaimer, the term of this patent is extended or adjusted under 35 U.S.C. 154(b) by 0 days.

(21) Appl. No.: 18/130,257

(22) Filed: Apr. 3, 2023

(65) Prior Publication Data

US 2024/0330744 A1    Oct. 3, 2024

(51) Int. Cl.
    *G06N 20/00*       (2019.01)
(52) U.S. Cl.
    CPC .................. *G06N 20/00* (2019.01)
(58) Field of Classification Search
    None
    See application file for complete search history.

(56) References Cited

U.S. PATENT DOCUMENTS

| | | | |
|---|---|---|---|
| 7,836,055 B2 | 11/2010 | Macmahon | |
| 9,569,445 B2 | 2/2017 | Flores | |
| 11,321,012 B2 | 5/2022 | Horns | |
| 2013/0218899 A1* | 8/2013 | Raghavan | G06F 16/9024 707/E17.083 |
| 2021/0141778 A1 | 5/2021 | Madden | |
| 2021/0406964 A1* | 12/2021 | Copeland | G06N 20/00 |
| 2023/0359176 A1* | 11/2023 | Ramanasankaran | G01R 31/318552 |

* cited by examiner

*Primary Examiner* — Alan Chen
(74) *Attorney, Agent, or Firm* — Caldwell Intellectual Property Law

(57) ABSTRACT

An apparatus for digital asset map generation includes at least one processor and a memory communicatively connected to the at least one processor, wherein the memory contains instructions configuring the at least one processor to receive a digital collection from an entity, identify a plurality of digital asset from the digital collection, traverse the plurality of digital assets identified from the digital collection, determine at least one unique object within the plurality of digital assets as a function of the traversal, and generate a digital asset map as a function of the at least one unique object.

16 Claims, 6 Drawing Sheets

APPARATUS AND A METHOD FOR DIGITAL ASSET MAP GENERATION

FIELD OF THE INVENTION

The present invention generally relates to the field of automated solutions. In particular, the present invention is directed to an apparatus and a method for digital asset map generation.

BACKGROUND

Sometimes independent examination of an entity may include a complicated process, such as, without limitation, an audit. Such independent examination is time consuming to perform, and generally require inexact, labor-intensive processes with balkanized technical elements.

SUMMARY OF THE DISCLOSURE

In an aspect, an apparatus for digital asset map generation includes at least one processor and a memory communicatively connected to the at least one processor, wherein the memory contains instructions configuring the at least one processor to receive a digital collection from an entity, identify a plurality of digital asset from the digital collection, traverse the plurality of digital assets identified from the digital collection, determine at least one unique object within the plurality of digital assets as a function of the traversal, and generate a digital asset map as a function of the at least one unique object.

In another aspect, a method for digital asset map generation includes receiving, by at least one processor, a digital collection from an entity, identifying, by the at least one processor, a plurality of digital asset from the digital collection, traversing, by the at least one processor, the plurality of digital assets identified from the digital collection, determining, by the at least one processor, at least one unique object within the plurality of digital assets as a function of the traversal, and generating, by the at least one processor, a digital asset map as a function of the at least one unique object.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for digital asset map generation. In an embodiment, a digital asset map may include at least a node corresponding to at least one unique object determined based on a plurality of digital assets identified from a digital collection received from an entity. In another embodiment, digital asset map may include a digital asset path, wherein the digital asset path may include an edge connecting a first node representing a digital asset and a second node representing another digital asset. In other embodiments, generating digital asset map may include linking unique objects to user operation data. Exemplary embodiments illustrating aspects of the present disclosure are described below in the context of several specific examples.

Figure 1:
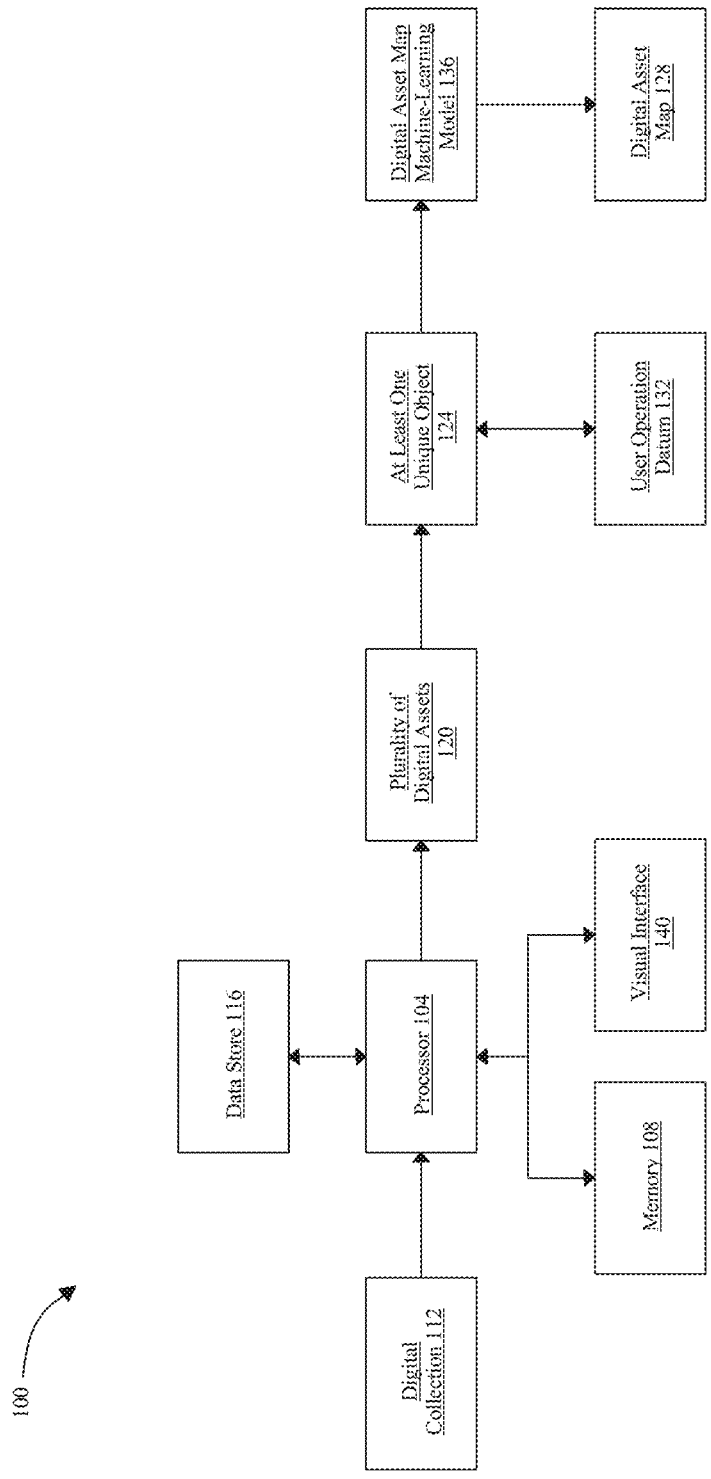
FIG. 1 is a block diagram of an exemplary embodiment of an apparatus for digital asset map generation.

Referring now to FIG. 1, an exemplary embodiment of an apparatus for digital asset map generation is illustrated. Apparatus includes a processor 104 and a memory 108 communicatively connected to the processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, processor 104 may further comprise and/or be included in a server. A server may include a computing device and/or a plurality of computing devices that provide functionality for other programs or devices. A server may provide various functionalities such as sharing data or resources and performing computation among multiple other programs and or devices. Servers may include database servers, file servers, mail servers, print servers, web servers, and/or application servers. In an embodiment, the server may communicate with processor 104 and/or any computing device described in this disclosure through a communication network. A communication network may include a network interface card (e.g., a mobile network interface card, a LAN card), a modem, and any combination thereof. A communication network may also include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. Information may be communicated to and/or from digital wallet through a communication network.

With continued reference to FIG. 1, processor 104 is configured to receive a digital collection 112 from an entity. As used in this disclosure, "receive" means to accept, collect, or otherwise gather input from the entity and/or a device. As used in this disclosure, an "entity" is an independent and distinct existence such as a legal person. In some cases, legal person may include, without limitation, individual, group of individuals, trust, foundation, partnership, limited partnership, corporation, other business entity or firm, or the like thereof. In other cases, legal person may further include government such as, without limitation, municipality, state government, provincial government, departmental government, national or federal government, quasi-governmental organization, and/or the like thereof. In some embodiments, entity may include one or more sub-entities such as, without limitation, departments or divisions of entities described above. In a non-limiting example, entity may include a user who uses apparatus 100. In some embodiments, entity may include a group of entities; for instance, group of individuals such as, without limitation, a group of users, a team, a small business, a company, and the like. In a non-limiting example, entity may include a small business to be examined. As used in this disclosure a "digital collection" is a collection of one or more digital assets related to the entity. A "digital asset," for the purpose of this disclosure, is any electronically based asset associated with and interconnected within a digital environment. For example, digital assets may include servers, databases, and computing main frames for the digital environment. In a further exemplary embodiment, digital assets may also include computer-based programs, computer program data, and the like. Each digital asset may be connected by a communication network. The communication network may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In a non-limiting example, digital assets related data may include data such as, without limitation, file name, document type, system log, system configurations, any properties or parameters related to digital asset and the like thereof.

With continued reference to FIG. 1, in some embodiments, digital asset may include one or more hardware devices. As used in this disclosure, a "hardware device" is a physical part of computing device described in this disclosure. In some cases, hardware device may include, without limitation, processor 104, memory 108, graphic processing unit (GPU), data storage, sound card, and the like thereof. In some cases, hardware device may further include any other physical components connected to computing devices, such as, without limitation, mouse, keyboard, monitor, and the like thereof. In some embodiments, digital asset may include a digital representation of one or more hardware devices. In a non-limiting example, digital asset may include one or more digital representation of hardware device such as, without limitation, hardware parameters, measurements and value related to one or more hardware devices, and the like thereof; for instance, and without limitation, digital asset may include a numeric specification of a storage size of a data storage disk. In some cases, digital asset may include the one or more computing device. Computing device may include any computing device described in this disclosure. In some cases, digital asset including computing device may include one or more corresponding operating systems, such as, without limitation, MICROSOFT WINDOWS, MACOS, LINUX, UBUNTU, and the like thereof. In some cases, digital asset may include one or more databases, such as, without limitation, data store 116, and the like thereof. For example, and without limitation, digital collection 112 may include a plurality of digital assets. Plurality of digital assets may include a reference to a same database. Plurality of digital assets may also include a reference to different databases. In some cases, plurality of digital assets may include different database shards, wherein the database shard is a partition of data stored in database. In other cases, each digital asset of plurality of digital assets may include a collection of data within database; for instance, and without limitation, each digital asset of plurality of digital assets may include one or more tables within database. In some embodiments, digital asset may further include a digital representation of one or more computing devices. In a non-limiting example, digital asset may include a virtual machine, wherein the virtual machine is a virtual environment that functions as a virtual computer system with its own virtual CPU, memory, network interface, storage and the like. In some cases, virtual machine may provide functionalities of a physical computer. In some embodiments, virtual machine may be created on physical hardware devices (located off- or on-premises of entity).

With continued reference to FIG. 1, in some embodiments, digital asset may include one or more data objects. As used in this disclosure, a "data object" is a collection of a plurality of data points, wherein each data point of plurality of data points contain data describe an aspect, characteristic, quality, or otherwise descriptor of an object. In some cases, digital collection 112 may include a plurality of data objects. Each data objects of plurality of data objects may include a corresponding data structure. Data structure could be any data structure described in this disclosure. In some embodiments, plurality of data objects may share a common data structures. In a non-limiting examples, each data object of plurality of data objects may be initialized as a linear data structure such as, without limitation, array, list, queue, stack, and the like thereof. Data object may be configured to store one or more value and/or data, such as, without limitation, business record, customer record, usage history, and the like thereof. In a non-limiting example, a digital collection may be a string containing a plurality of words, wherein each word may be a data object. In another non-limiting example, a digital collection may be an array of numbers, wherein each number may be a data object. In other embodiments, plurality of data objects may be in different data structures. In a non-limiting example, a first data object may be initialized as a linear data structure as described above while a second data object may be initialized as a non-linear data structure such as, without limitation, tree, graph, or digital asset map described in further detail below. Such plurality of data objects may be configured to store different data. In another non-limiting example, plurality of data objects of digital asset may include one or more digital packets such as, without limitation, network packet described below in this disclosure. Data asset may include one or more data transfer protocols for exchanging plurality of data objects; for instance, and without limitation, data transfer protocol may include transfer control protocol/Internet protocol (TCP/IP), machine access control (MAC), hypertext transfer protocol (HTTP), secure hypertext transfer protocol (HTTPS), or the like thereof.

With continued reference to FIG. 1, in some embodiments, digital asset may include one or more computer programs. As used in this disclosure, a "computer program" is a sequence or set of instructions in a programming language for a computer to execute. Computer may include any computing device described in this disclosure. In a non-limiting example, digital asset may include an enterprise application such as, without limitation, application for enterprise resource planning (ERP), customer relationship management (CRM), decision supporting system (DSS), knowledge management system (KMS), and the like thereof. In some embodiments, entire or portion of the sequence or set of instructions may be stored as one or more data object described above. In a non-limiting example, digital assets may include one or more data objects containing one or more source code file of one or more computer programs. In other embodiments, digital assets may include one or more executable computer program directly. In a non-limiting example, digital assets may include an executable instance reference a computer program within entity's environment. Digital assets may also include an executable clone of the computer program. In some embodiments, digital asset may include a piece of a computer program. In some cases, a piece of computer program may only include a subset of functionalities of the original computer program. In a non-limiting example, digital asset may include one or more application programing interface (API) of a computer program, wherein the API is a type of program interface which offers one or more functions or services to other digital assets such as, without limitation, other computer programs.

Additionally, or alternatively, a piece of a computer program may include a block of a program architecture of the computer program. In another word, one or more digital assets in a certain sequence may map out a complete program architecture, such as, without limitation, n-tier architecture, event-driven architecture, microkernel architecture, microservice architecture, and the like thereof. In a non-limiting example, digital collection may include a plurality of digital assets, wherein each digital asset of plurality of digital asset may include a computer program at different tier (i.e., layer); for instance, and without limitation, plurality of digital asset may include a first digital asset including the computer program at a presentation tier, a second digital asset including computer program at a logic tier, and a third digital asset including computer program at a data tier. First digital asset may include one or more user interfaces of computer program. Second digital asset may include one or more business models implemented within computer program. Third digital asset may include one or more databases that supports one or more business models within second digital asset. In another non-limiting example, digital collection may include one or more digital assets including piece of a computer program for production, detection, consumption of, and/or reaction to one or more events, wherein the event is an identifiable occurrence in entity's environment that contain significance for entity, the computer program, or plurality of digital assets that carries the computer program such as, without limitation, systems, devices, and the like thereof. In some cases, digital asset may include an event such as, without limitation, a request from entity to a server, a response from the server to entity, and the like thereof. In a further non-limiting example, digital asset may further include one or more microservices, wherein the microservice is an independent service of the entity, such as, without limitation, business service, development services, and the like thereof.

With continued reference to FIG. 1, in some embodiments, digital asset may include one or more supporting structures for computer program described above. In some embodiments, digital asset may include one or more frameworks. As used in this disclosure, a "framework" is an abstraction of a computer program which provides generic functionality for maintaining the computer program. In some embodiments, framework may include, without limitation, support programs, compilers, code libraries, dependencies, toolsets, APIs, and the like thereof. In some embodiments, entity may modify digital asset containing framework of computer program; for instance, and without limitation, entity may extend the framework through selective overriding overrides a template function of a superclass within a first digital asset using a hook function of a subclass in a second digital asset. In a non-limiting example, digital asset may include a web framework, wherein the web framework may include one or more mechanisms for request handling and/or state management. In some embodiments, digital asset may include one or more plugins, wherein the plugin is a supporting element for a computer program which provides additional functionality to the computer program. In a non-limiting example, digital asset may include one or more web plugins. In some embodiments, digital asset may include one or more middleware, wherein the middleware is a supporting element that provides services to computer program beyond those available from operating system. In a non-limiting example, digital asset may include one or more middleware that is configured to handle system communication, such as, without limitation, system input, system output, and the like thereof. Persons skilled in the art, upon reading the entirety of this disclosure, will be aware of various digital assets listed above and other potential digital assets for purposes described herein.

In some cases, digital collection 112 may be in a digital file format including, without limitation, txt file, JSON file, word document, pdf file, excel sheet, image, video, audio, and the like thereof. In other cases, digital collection 112 may be present in any data structure described in this disclosure. In some embodiments, without limitation, digital collection 112 may include any protective information related to the entity. In some cases, protective information may include, without limitation, entity's name, identification, profession, geographical information, background information, and the like thereof. In a non-limiting example, digital collection 112 may include a plurality of data objects such as, without limitation, bank statements, invoices, receipts, income statements, balance sheets, and the like in electronic file format such as, without limitation, pdf file format. In this case, digital collection 112 may include a directory of data objects.

Still referring to FIG. 1, entity providing such digital collection 112 may be in a digital environment. A "digital environment," for the purpose of this disclosure is an integrated communications environment where digital devices communicate and manage data and interactions within the digital environment. Digital device may be any computing device as described in this disclosure, for example as described in FIG. 6. Any processing step described in this disclosure may be performed in digital environment. For example, the digital environment may be one of a computer system, computer network, and the like. In an exemplary embodiment, the digital environment may include a plurality of user devices. A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100 and/or any computing device. In some embodiments, the digital environment may also include any electronically based asset associated with the digital environment, as described in this disclosure. For example, electronically based digital assets may be computer programs, data, data stores, and the like, but are not limited to such examples. The digital environment may be connected to processor 104 by a network. Digital environment may employ any type of network architecture. For example, the digital environment may employ a peer to peer (P2P) architecture where each computing device in a computing network is connected with every computing device in the network and every computing device acts as a server for the data stored in the computing device. In a further exemplary embodiment, the digital environment may also employ a client server architecture where a computing device is implemented as a central computing device (e.g., server) that is connected to each client computing device and communication is routed through the central computing device. However, the network architecture is not limited thereto. One skilled in the art will recognize the various network architectures that may be employed by the digital environment. Further, any network topology may be used. For example, the digital environment may employ a mesh topology where a computing device is connected to one or multiple other computing devices using point to point connections. However, the network topology is not limited thereto. One skilled in the art will recognize the various network architectures that may be employed by the digital environment. Digital environment will be described in more detail below in reference to FIG. 3.

With further reference to FIG. 1, receiving the digital collection may include aggregating the plurality of digital assets related data and digital collection using an aggregator. As used in this disclosure, "aggregating" means to combining, appending, or otherwise compositing data objects with digital collection 112. As described herein, "digital assets related data" are data related to digital assets. As used in this disclosure an "aggregator" is a component designed to collect data from one or more sources. In some embodiments, aggregator may include a software program. In a non-limiting example, processor 104 may utilize a Really Simple Syndication (RSS) aggregator that collects RSS feeds (i.e., digital asset related data) from web pages such as, without limitation, job posting, web posting, customer profiles, and the like, without visiting each web page. In some embodiments, aggregator may include one or more value-added processing. Continuing with the example, RSS feeds collected from web pages may be processed, converted, normalized, or enhanced into data object by the aggregator. Aggregator may be configured to repackage processed RSS feeds into digital collection 112.

With continued reference to FIG. 1, digital collection 112, elements thereof, and/or any data described in this disclosure may be received and/or stored in a data store 116 such as, without a limitation, a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, apparatus 100 and/or digital environment may include a cloud environment. As used in this disclosure, a "cloud environment" is a set of systems and/or processes acting together to provide services in a manner that is dissociated with underlaying hardware and/or software within apparatus 100 used for such purpose and includes a cloud. A "cloud," as described herein, refers to one or more servers that are accessed over the internet. In some cases, cloud may include Hybrid Cloud, Private Cloud, Public Cloud, Community Cloud, any cloud defined by National Institute of Standards and Technology (NIST) and the like thereof. In some embodiments, cloud may be remote to apparatus 100; for instance, cloud may include a plurality of functions distributed over multiple locations external to apparatus 100. Location may be a data center. In a non-limiting example, data store 116 may run on one or more cloud servers. Data within data store 116 such as, without limitation, digital collection 112 may not be found in local storage of apparatus 100. In some embodiments, cloud environment may include implementation of cloud computing. As used in this disclosure, "cloud computing" is an on-demand delivery of information technology (IT) resources within a network through internet, without direct active management by either first entity or second entity. In some embodiment, without limitation, cloud computing may include a Software-as-a-Service (SaaS). As used in this disclosure, a "Software-as-a-Service" is a cloud computing service model which make software available to the user using apparatus 100 directly; for instance, SaaS platform may provide partial or entire set of functionalities of apparatus 100 to the entity without direct installation of the entire set of functionalities. In a non-limiting example, data store 116 may be disposed in a SaaS platform. Receiving data such as, without limitation, digital collection 112 may include storing data listed above in SaaS platform such as, without limitation, MICROSOFT 365, SALESFORCE, DROPBOX, G SUITE, and the like thereof. In some embodiments, data store 116 may be configured to backup stored data such as, without limitation, digital collection 112, through cloud-to-cloud backup. Continuing the example, SaaS platform may be configured to create a plurality of copies of stored data described above and storing the plurality of copies in another public cloud such as, without limitation, AWS.

Continuing to refer to FIG. 1, processor 104 is configured to identify a plurality of digital assets 120 from digital collection 112. Digital assets may include any digital asset described in this disclosure. In some embodiments, identifying plurality of digital assets may include identifying plurality of digital assets according to an event workflow of the entity. In some cases, event workflow may include one or more steps of performing an event. In some embodiments, event may include activity such as, without limitation, business activity, system activity, any activity and the like thereof. In a non-limitation, identifying plurality of digital assets may include identifying plurality of digital assets been utilized in an event workflow such as, without limitation, event workflow of making a transaction. Digital assets 120 may include devices and/or programs used for making a transaction. Digital assets 120 may also include corresponding device and/or program data. Digital assets 120 may further include data related to the transaction, such as, without limitation, data related to one or more parties, data related to the trading items, contracts, and the like thereof. In other embodiments, plurality of digital assets 120 may be identified as a function of digital asset related data collected and/or processed by aggregator described above. In a non-limiting example, plurality of digital assets 120 identified from digital collection 112 may include one or more data sources, such as, without limitation, Uniform Resource Locators (URLs), databases, servers, and the like thereof. Processor 104 may be configured to identify plurality of digital assets 120 from digital collection 112 and store the identified digital assets 120 in data store 116. Additionally, or alternatively, identifying plurality of digital assets 120 from digital collection 112 may include applying a digital asset filter to digital collection 120. As used in this disclosure, a "digital asset filter" is a piece of program configured to remove one or more secondary elements such as, without limitation, data objects contain no digital asset, from primary elements such as, without limitation, digital collection 112. In a non-limiting example, digital asset filter may include a digital executor, wherein the digital executor is a module designed to read and/execute digital assets; for instance, digital executor may be configured to read a piece of code embedded in a data object. Processor 104 may identify the data object as digital asset after the execution. For another example, and without limitation, digital executor may be configured to directly execute a data object. Processor 104 may be configured to remove the data object upon an event of single point failure in the execution. Digital executor may then move to a next data object within digital collection 112. Further, plurality of digital assets 120 may be manually identified from digital collection 112 by the entity. Entity may manually label one or more data objects as digital assets 120 within digital collection received by processor 104.

With continued reference to FIG. 1, processor 104 may be configured to store plurality of digital assets 120 identified from digital collection 112 in a vector. As used in this disclosure, a "vector" is a data structure that represents one or more quantitative values and/or measures of plurality of digital assets 120. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes.

With continued reference to FIG. 1, in other embodiments, processor 104 may be configured to store plurality of digital assets 120 identified from digital collection 112 in a dictionary. As used in this disclosure, a "dictionary" is a data structure containing an unordered set of key value pairs. In this disclosure, a "key value pair" is a data representation of a data element such as, without limitation, digital asset. In some cases, dictionary may be an associative memory, or associative arrays, or the like thereof. In a non-limiting example, dictionary may be a hash table. In an embodiment, a key value pair may include a unique key, wherein the unique kay may associate with one or more values. In another embodiment, key value pair may include a value, wherein the value may associate with a single key. In some cases, each key value pair of set of key value pairs in dictionary may be separated by a separator, wherein the separator is an element for separating two key value pairs. In a non-limiting example, separator may be a comma in between each key value pairs of plurality of key value pairs within dictionary. In another non-limiting example, a dictionary may be expressed as "{first key value pair, second key value pair}," wherein the first key value pair and the second key value pair may be separate by a comma separator, and wherein both first key value pair and second key value pair may be expressed as "first/second key: first/second value." In a further non-limiting example, plurality of digital assets 120 identified from digital collection 112 may be present as a dictionary: "{x: A, y: B}," wherein x may be a first entry correspond to a first digital asset A and y may be a second entry correspond to a second digital asset B. Additionally, or alternatively, dictionary may include a term index, wherein the term index is a data structure to facilitate fast lookup of entries within dictionary (i.e., index). In some cases, without limitation, term index may use a zero-based indexing, wherein the zero-based indexing may configure dictionary to start with index 0. In some cases, without limitation, term index may use a one-based indexing, wherein the one-based indexing may configure dictionary to start with index 1. In other cases, without limitation, term index may use a n-based indexing, wherein the n-based indexing may configure dictionary to start with any index from 0 to n. Further, term index may be determined/calculated using one or more hash functions. As used in this disclosure, a "hash function" is a function used to map data of arbitrary size to a fixed-size value. In some cases, a fixed-size value may include, but is not limited to, hash value, hash code, hash digest, and the like. In a non-limiting example, plurality of digital assets 120 identified from digital collection 112 may be present as a dictionary containing a plurality of hashes generated using hash function such as, without limitation, identity hash function, trivial hash function, division hash function, word length folding, and the like, wherein each hash of plurality of hashes may represents a single entry of a single digital asset within plurality of digital assets 120.

With continued reference to FIG. 1, in other embodiments, processor 104 may be configured to store plurality of digital assets 120 identified from digital collection 112 in other data structure such as, without limitation, tuple, single dimension array, multi-dimension array, list, linked list, queue, set, stack, dequeue, stream, map, graph, tree, and the like thereof. In some embodiments, plurality of digital assets 120 may be stored in a combination of more than one above data structures. In a non-limiting example, plurality of digital assets 120 may be stored a dictionary of lists. As will be appreciated by persons having ordinary skill in the art, after having read the entirety of this disclosure, the foregoing list is provided by way of example and other data structures can be added as an extension or improvements of apparatus 100 disclosed herein. In some embodiments, without limitation, data structure may include an immutable data structure, wherein the immutable data structure is a data structure that cannot be changed, modified, and/or updated once data structure is initialized. In other embodiments, without limitation, data structure may include a mutable data structure, wherein the mutable data structure is a data collection that can be changed, modified, and/or updated once data structure is initialized. Additionally, or alternatively, plurality of digital assets 120 may be stored in one or more electronic files such as, without limitation, txt file, JSON file, XML file, word document, pdf file, excel sheet, image, video, audio, and the like thereof. In a non-limiting example, processor 104 may be configured to store plurality of digital assets 120 identified from digital collection 112 in a directory.

With continued reference to FIG. 1, in some cases, data within data structure described above may be sorted in a certain order such as, without limitation, ascending order, descending order, and the like thereof. In some embodiments, sorting data such as, without limitation, plurality of digital assets 120 may include using a sorting algorithm. In some cases, sorting algorithm may include, but is not limited to, selection sort, bubble sort, insertion sort, merge sort, quick sort, heap sort, radix sort, and the like thereof. Continuing with the example, processor 104 may be configured to sort plurality of digital assets 120 identified from digital collection 112 in the directory in an order of being identified. As will be appreciated by persons having ordinary skill in the art, after having read the entirety of this disclosure, the foregoing list is provided by way of example and other sorting algorithm can be added as an extension or improvements of apparatus 100 disclosed herein.

With continued reference to FIG. 1, processor 104 is configured to traverse plurality of digital assets 120 identified from digital collection 112. As used in this disclosure, "traverse" means to visit or otherwise touch the elements of a given structure. In a non-limiting example, traversing plurality of digital assets 120 identified from digital collection 112 may include iterating data structure that stores such plurality of digital assets 120 as described above in this disclosure. In a non-limiting example, processor 104 may be configured to iterate a list of identified digital assets using an iterator, wherein the iterator is a component configured to move from a first digital asset to a second digital asset according to an iteration order. In some cases, iteration order may be consistent with order of being identified. In some embodiments, traversing plurality of digital assets 120 identified from digital collection 112 may include tracking visited digital assets. Continuing with the example, processor 104 may be configured to mark first digital asset as "visited" while moving from first digital asset to second digital asset. Iterator may further move from second digital asset to a third digital asset. Second digital asset may then be marked as "visited." In other embodiments, traversing plurality of digital assets 120 identified from digital collection 112 may include traversing plurality of digital assets 120 recursively without using iterator.

With continued reference to FIG. 1, in some embodiments, traversing plurality of digital assets 120 may include accessing plurality of digital assets 120 in digital environment described in this disclosure. In some cases, processor 104 may be configured to traverse plurality of digital assets 120 through one or more digital connections between plurality of digital assets. As used in this disclosure, a "digital connection" is a connection between two or more digital assets. In some embodiments, digital connection may include communication between a first digital asset and a second digital asset. In some cases, digital connection may include a wire connection; for instance, and without limitation, first digital asset may be communicatively connected to second digital asset through wires, cables, or the like. In other cases, digital connection may include a wireless connection; for instance, and without limitation, first digital asset may be communicatively connected to second digital asset without wires, cables, or the like. First digital asset may communicate with second digital asset through a network. In a non-limiting example, first digital asset may pass communication to second digital asset and/or other digital assets connected through digital connections with a local area network (LAN) and/or a wide area network (WAN).

With continued reference to FIG. 1, in a non-limiting example, traversing plurality of digital assets 120 may include traversing source code of plurality of digital assets. Each digital asset of plurality of digital assets 120 may include one or more data objects containing source code of an application, such as, without limitation, an enterprise application. Traversing plurality of digital assets 120 may include visit a second digital asset through a first digital asset, wherein the second digital asset may include a child data object of a parent data object within the first digital asset. In some cases, parent data object may include a superclass and child data object may include a subclass that inherits from the superclass. In another non-limiting example, each digital asset of plurality of digital assets 120 may include one or more API calls. Traversing plurality of digital assets 120 may include traversing API calls. Functions of application may include a sequence of API calls; for instance, and without limitation, a first digital asset may include an API call for handling a user request at a designated server, a second digital asset may include an API call for querying a database selected based on the user request, and a third digital asset may include an API call for generating a user response based on the query result. Traversing plurality of digital assets 120 may include executing API call of second digital asset through API call of first digital asset and executing API call of third digital asset through API call of second digital asset. In other non-limiting examples, each digital asset of plurality of digital assets 120 may include system configurations of a digital device within digital environment such as, without limitation, a mainframe. System configurations may include, without limitation, environment paths, data paths, memory locations, entity credentials, MAC address, other local or global network address, and the like thereof. Traversing plurality of digital assets 120 may include checking plurality of system configurations within plurality of digital assets 120. In other non-limiting examples, each digital asset of plurality of digital assets 120 may include a table of a database. Plurality of tables may be connected through primary keys and/or foreign keys of plurality of tables. Traversing plurality of digital assets 120 may include traversing plurality of tables within database through primary keys and/or foreign keys. Additionally, or alternatively, traversing plurality of digital assets 120 may include analyzing plurality of digital assets 120 and identifying directions of digital connections between plurality of digital assets 120; for instance, and without limitation, directions of digital connections may be identified as a function of an order of execution of plurality of digital assets in a process. Persons skilled in the art, upon reading the entirety of this disclosure, will be aware of various ways of traversing plurality of digital assets listed above and other potential ways of traversing plurality of digital assets for purposes described herein.

Still referring to FIG. 1, processor 104 is configured to determine at least one unique object 124 within plurality of digital assets 120 as a function of the traversal. As used in this disclosure, an "unique object" is a single digital asset which plurality of digital assets 120 does not contain other digital assets that are identical or similar to it. In some embodiments, unique object may include digital asset with unique asset properties such as, without limitation, asset type, asset content, asset functionality, and the like thereof. In some embodiments, at least one unique object 124 may include a unique content of plurality of digital assets. In a non-limiting example, plurality of digital assets 120 may include a first digital asset and a second digital asset, wherein both the first digital asset and the second digital asset may include an instance reference to a same application. In some cases, either first digital asset or second digital asset containing instances of the application may be determined as unique object 124 but not both. In other cases, processor 104 may determine the application as unique object 124. In some embodiments, determining at least one unique object 124 may include comparing plurality of digital assets 120 identified from digital collection 112 and determining at least one unique object 124 as a function of the comparison. In a non-limiting example, comparing plurality of digital assets 120 may include comparing a currently visiting digital asset with visited digital assets tracked by processor 104. Visited digital asset may be unique object determined in previous iteration, thus, digital asset from first iteration during the traversal may always be unique object. Currently visiting digital asset may be determined as unique object if one or more asset properties are different than asset properties of visited digital assets. In an embodiment, without limitation, processor 104 may be configured to determine at least one unique object 124 from a plurality of "visited" digital asset based on asset type of each "visited" digital asset; for instance, a "visited" digital asset may include an asset type of text document while the rest digital assets are digital images. Processor 104 may determine the "visited" digital asset as a unique object. In another embodiment, without limitation, processor 104 may be configured to determine at least one unique object 124 from a plurality of "visited" digital asset based on asset content; for instance, a "visited" digital asset may include a first protocol for an event, and the rest digital assets may include a second protocol for the same event, wherein the first protocol and the second protocol is different. Processor 104 may determine the "visited" digital asset as a unique object. In other embodiments, without limitation, processor 104 may be configured to determine at least one unique object 124 from a plurality of "visited" digital asset based on asset functionality; for instance, a "visited" digital asset may include a program with a first function, and the rest digital assets may include programs with an implementation of a second function. Processor 104 may determine the "visited" digital asset as a unique object. One skilled in the art will recognize unique objects and various ways of identifying or determining unique objects that may be employed by apparatus 100. Additionally, or alternatively, processor 104 may be configured to flag at least one unique object 124. As used in disclosure, "flag" means to signal, indicate, or otherwise control an intermediate state of digital asset. Intermediate state of digital asset may include, without limitation, variable indicating uniqueness, degree of uniqueness, score of dissimilarity, and the like thereof. In a non-limiting example, flagging at least one unique object 124 may include store at least one unique object 124 in data store 116 along with a Boolean variable indicating the uniqueness of its corresponding digital asset; for instance, "True" digital asset may be unique object while "False" digital asset may be redundant digital asset.

With continued reference to FIG. 1, processor 104 is configured to generate a digital asset map 128 as a function of at least one unique object 124. As used in this disclosure, a "digital asset map" is a data structure describing unique objects and/or digital assets as described above, and interconnections between such unique objects and/or digital assets that represent paths as described above. In some embodiments, digital asset map may be configured to describe one or more automated processes. Automated process may include any event workflow described in this disclosure. In some cases, automated process may include process for activity such as, without limitation, data collection, audit, data management, data analysis, and the like thereof. In some embodiments, digital asset map 128 may be non-linear. In a non-limiting example, digital asset map 128 may include a graph, such as, without limitation, finite graph, multi graph, weighted graph, directed graph, and the like thereof. In some embodiment, digital asset map 128 may include at least a node. As used in this disclosure, a "node" is an element which contains a value or data and optionally contains one or more connection to other nodes. In a non-limiting example, node may correspond to at least one unique object 124 within plurality of digital assets 120. Digital asset map 128 may include plurality of nodes. In some embodiments, plurality of nodes may include one or more root nodes, or nodes that serve as starting points of one or more automated process. In some embodiments, plurality of nodes may include one or more terminal nodes, which may alternatively or additionally be referred to herein as a "intermediate node," corresponding to one or more execution result or termination of one or more automated process. In some embodiments, digital asset map 128 may further include a digital asset path. As used in this disclosure, a "digital asset path" is a data path for a single automated process from end to end. In other words, digital asset path within digital asset map 128 may include at least one root node and at least one terminal node. In some embodiments, digital asset path may include an edge. As used in this disclosure, an "edge" is a connection between two nodes of digital asset map 128. In a non-limiting example, digital asset map 128 may include a digital asset path, wherein the digital asset path may include an edge connecting a first node such as, without limitation, a root node to a second node such as, without limitation, a terminal node. Generating digital asset map 128 may include linking at least one unique object 124 to a user operation datum 132 and storing the at least one unique object 124 to at least a node. As used in this disclosure, a "user operation datum" is a user/entity step, function, or otherwise a protocol, of an automated process. In a non-limiting example, an automated process may include a plurality of user operation data, wherein each user operation datum defines a single step of the automated process. Processor 104 may be configured to link at least one unique object 124 to each user operation datum of plurality of user operation data; for instance, and without limitation, a node within digital asset map 128 may include a user operation datum 132 and its linked unique object 124.

Linked unique object 124 may include one or more digital assets involved in the single step of the automated process. For example, and without limitation, linked unique object 124 may include digital assets such as specific programs, data storage locations, servers, devices, and the like thereof. Additionally, or alternatively, automated process may include one or more digital asset paths. Further, processor 104 may generate two or more digital asset maps 128, which may overlap. In a non-limiting example, a root node of one digital asset map may connect to one or more terminal node or link to user operation datum of another digital asset map, nodes of one digital asset map may be shared with another digital asset map, or the like.

Still referring to FIG. 1, in some embodiments, edge within digital asset map 128 may be directed. In a non-limiting example, generating digital asset map 128 may include connecting a first node and a second node through a directed edge, wherein the directed edge may include a directional element which allows data to flow in one or more directions specified by the directional element. Directions may be determined by user operation datum 132; for instance, and without limitation, for a repeatable step or process, directed edge may point back to its starting node, forming a loop. In some cases, directed edge may include unidirectional edge. For example, and without limitation, data may flow in only one direction such as from first node to second node or second node to first node. Digital asset path may include a unidirectional digital asset path, wherein the unidirectional digital asset path may include at least one unidirectional edge. At least one unidirectional edge may allow a transfer between a first user operation datum and/or its corresponding unique object to a second user operation datum and/or its corresponding unique object, wherein revisiting the first user operation datum and/or its corresponding unique object may be blocked by processor 104 after the transfer. In other cases, directed edge may include bidirectional edge. For example, and without limitation, data may flow in both directions such as from first node to second node and second node to first node. Digital asset path may include a bidirectional digital asset path, wherein the bidirectional digital asset path may include at least one bidirectional edge. At least one bidirectional edge may allow transfer between a first user operation datum and/or its corresponding unique object to a second user operation datum and/or its corresponding unique object in both ways without limitation. Alternatively, or additionally, digital asset path may include a hybrid digital asset path, wherein the hybrid digital asset path may include one or more unidirectional edges and one or more bidirectional edges between plurality of nodes within hybrid digital asset path; for instance, and without limitation, digital asset map 128 may include a first node (i.e., root node) connected to a second node (i.e., intermediate node) through a unidirectional edge and the second node connected to a third node (i.e., terminal node) through a bidirectional edge. Such hybrid digital asset path within digital asset map 128 may enable re-evaluation of execution result, update user operation datum 132 and/or unique object 124, or the like of automated process described in digital asset map 128.

Continuing to refer to FIG. 1, in some embodiments, digital asset path may include a single unique path, wherein the single unique path is a digital asset path with only one sequence of edges and nodes for a given process. In a non-limiting example, an automated process may require an entity to use a single application, which queries a unique database, then generates a result. In other embodiments, digital asset path may include a parallel sub-path, wherein the parallel sub-path is a digital asset path with a partially or completely different or shared sequence of edges and nodes that achieve the same goal compared to other digital asset paths for a given process. Continuing with the example, digital asset map may include an alternative path for the automated process, wherein the alternative path may include two or more edges and/or nodes in parallel that could be traversed to generate the same result. Entity may use two different applications which query redundant databases in order to generate the same result. Additionally, or alternatively, digital asset path may include a shared edge, wherein the shared edge is an edge that is utilized by more than one digital asset path. In a non-limiting example, several business tasks may use a same enterprise-layer application at a first node and query a same database at a second node, wherein the edge connecting the first node and the second node may be a shared edge. These business tasks may diverge in other ways (i.e., second node may connect to different third nodes). Further, edges within digital asset path may include a weight, wherein the weight refers to the strength of the connection between connected nodes. In some embodiments, weight may be determined and/or assigned to one or more edges by processor 104. Edges may be weighted or otherwise marked to indicate relative efficiency and the like. In a non-limiting example, a digital asset path may include a parallel sub-path, wherein the parallel sub-path may be more efficient than the digital asset path; for instance, and without limitation, digital asset path may include unique objects such as more distant server, disorganized database, and the like, while parallel sub-path may include unique objects such as nearby server, a backup database, and the like thereof. In this cases, parallel sub-path may include edges with higher weights compared to edges within digital asset path.

With continued reference to FIG. 1, processor 104 may implement one or more algorithms or generate one or more machine-learning modules, such as digital asset map machine-learning model 136, to convert the at least a data set. In one or more embodiments, the machine-learning module may be generated using training data. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from a database, such as any database described in this disclosure, or be provided by an entity such as a user or a company. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Digital asset map machine-learning model 136 may be generated using training data. Digital asset map machine-learning model 136 may be trained by correlated inputs and outputs of training data. Inputs of training data may include a plurality of data sets. Outputs of training data may include conversion, compiling, analyzing, and the like corresponding to the inputs. Training data may be data sets that have already been converted whether manually, by machine, or any other method. Training data may include previous outputs such that digital asset map machine-learning model 136 iteratively produces outputs. Digital asset map machine-learning model 136 using a machine-learning process may output converted data based on input of training data.

Figure 4:
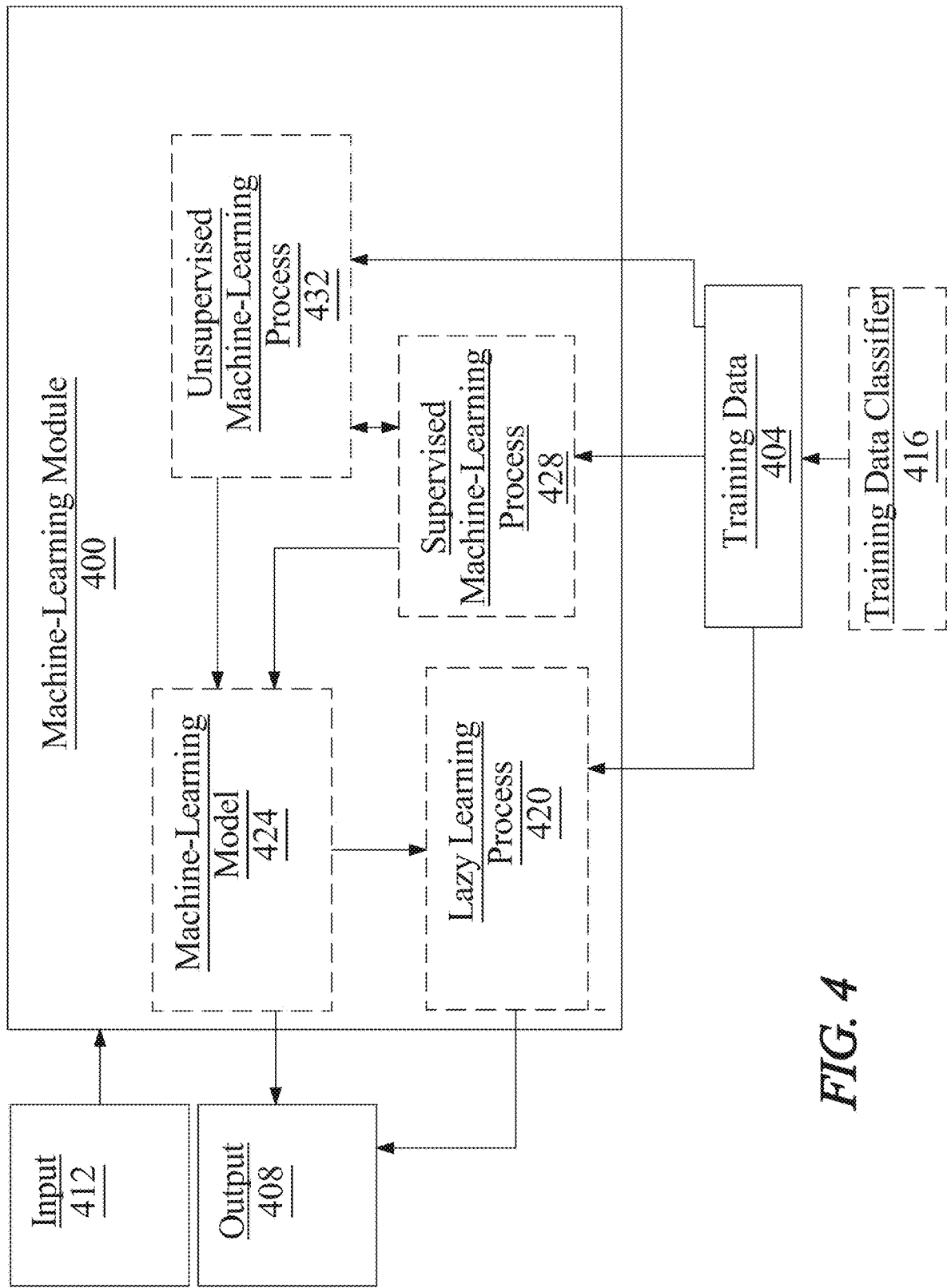
FIG. 4 is an exemplary embodiment of a machine-learning module.

With continued reference to FIG. 1, in an embodiment, digital asset map 128 may be generated using a machine learning model, discussed in further detail in FIG. 4, such as digital asset map machine-learning model 136 generated processor 104. The digital asset map machine-learning model may be trained by training data, such as digital asset training data. Digital asset training data, wherein the digital asset training data may include a plurality of digital asset sets as input correlated to a plurality of digital asset maps as output. Digital asset sets may include a plurality of digital assets. In a non-limiting example, digital asset sets may include plurality of digital assets 120 identified from digital collection 112. Generation of digital asset map 128 using a machine learning model may include receiving digital asset training data from data store 116. In some embodiments, the digital assets training data may also include a plurality of digital collections that are each correlated to one of a plurality of digital asset maps.

With continued reference to FIG. 1, generating the digital asset map 128 may include displaying digital asset map 128 through a visual interface 140. As used in this disclosure, a "visual interface" is a form of interface that is visible to an entity and allows the entity to interact with apparatus 100 through one or more interaction components. As used in this disclosure, an "interaction component" is an element that is interactable within visual interface. In a non-limiting example, visual interface 140 may be a graphical user interface (GUI). In some cases, interaction component, may include, without limitation, button, link, image, video, audio, and the like thereof. In some embodiments, visual interface 140 may be configured to display digital asset map 128, including, without limitation, nodes, edges, digital asset paths, user operation datum, unique objects and the like thereof. In a non-limiting example, visual interface 140 may be configured to display digital asset map 128, wherein each node within digital asset map 128 may be an interaction component. Entity may interact with interaction component to access user operation datum 132 and at least one unique object 124 linked to it. Additionally, or alternatively, generating the digital asset map 128 may include storing digital asset map 128 in a database such as, without limitation, data store 116.

Figure 2:
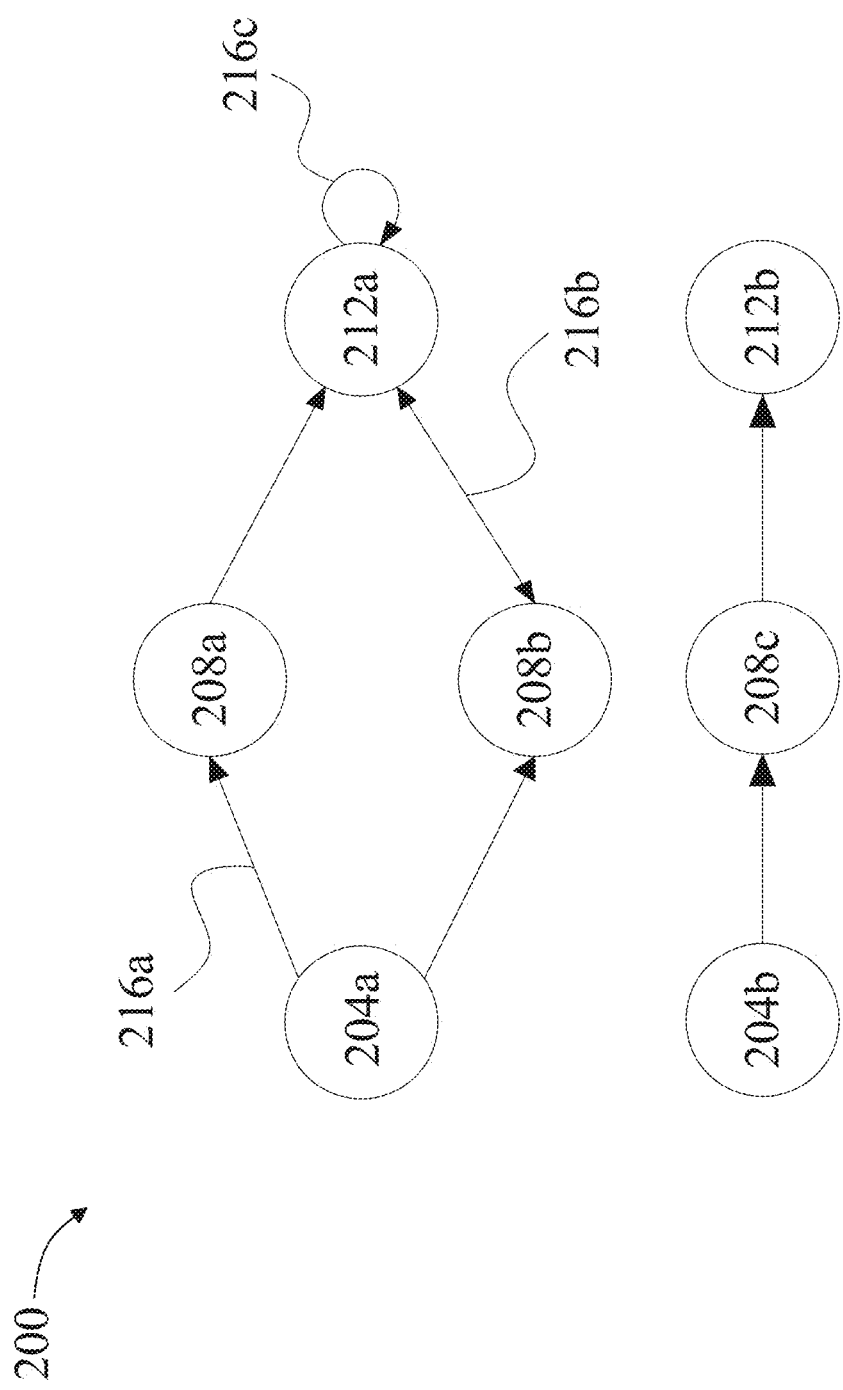
FIG. 2 is an exemplary embodiment of a digital asset map.

Now referring to FIG. 2, an exemplary embodiment of a digital asset map 200 is illustrated. Digital asset map may include a plurality of nodes. Node may include any node described above in this disclosure. Each node of plurality of nodes may include value and/or data such as, without limitation, user operation datum 132, at least one unique object 124, and the like thereof. In some embodiments, plurality of nodes may include one or more root nodes 204*a-b*. Root nodes 204*a-b* may include an initial step, process, or element of an automated process. Automated process may include any process and/or event described above in this disclosure. In some embodiments, plurality of nodes may include one or more intermediate nodes 208*a-c*. In other embodiments, plurality of nodes may include one or more terminal nodes 212*a-b*. Terminal nodes 212*a-b* may include any an execution result or termination of the automated process. Intermediate nodes 208*a-c* may be disposed in between root nodes 204*a-b* and terminal nodes 212*a-b*.

With continued reference to FIG. 2, digital asset map 200 may include one or more digital assets paths. In some embodiments, digital asset path may include a complete path from root nodes 204*a-b* to terminal nodes 212*a-b*. A path may be marked as complete if and only if one or more edges 216*a-c* are connected between root nodes, terminal nodes, and intermediate nodes in between. In some embodiments, edges may include directed edges. In a non-limiting example, edges may include a unidirectional edge 216*a*, wherein the unidirectional edge 216*a* may only allow data flow from root node 204*a* to intermediate node 208*a* but block data flow from intermediate node 208*a* back to root node 204*a*. In another non-limiting example, edges may include a bidirectional edge 216*b*, wherein the bidirectional edge 216*b* may allow data flow in both ways: from intermediate node 208*b* to terminal node 212*a* and from terminal node 212*a* to intermediate node 208*b*. In other non-limiting examples, edges may include a ring edge 216*c*, wherein the ring edge is simply a directed edge with a direction that points back towards to the node (terminal node 212*a*) which it is attached.

With continued reference to FIG. 2, digital asset path may include a sequence of nodes and edges. In some embodiments, digital asset path may include nodes traversal based on one or more edges connected in between the nodes. In a non-limiting example, digital asset path may include a digital asset path "204*a*, 208*a*, 212*a*." This digital asset path may be a unidirectional digital asset path since all edges are unidirectional edge 216*a*. Processor 104 may not be able to visit terminal node 212*a* from root node 204*a* without visiting intermediate node 208*a* following such digital asset path. Similarly, processor 104 may not be able to revisit either intermediate node 208*a* or root note 204*a* from terminal node 212*a*. Additionally, or alternatively, processor 104 may be able to revisit terminal node 212*a* at terminal node 212*a* at any time through ring edge 216*c* (i.e., loop). In another non-limiting example, digital asset path may include a parallel sub-path "204*a*, 208*b*, 212*a*." This parallel sub-path may be a hybrid digital asset path which includes both bidirectional edge 216*b* and unidirectional edge 216*a*. Processor 104 may be able to visit terminal node 212*a* from intermediate node 208*b* and visit intermediate node 208*b* from terminal node 212*a* through bidirectional edge 216*b*. In a further non-limiting example, digital asset path may include a single unique path "204*b*, 208*c*, 212*b*." This single unique path may include only one sequence of edges and nodes for a given process, without alternative digital asset paths, parallel sub-paths, or shared paths.

Figure 3:
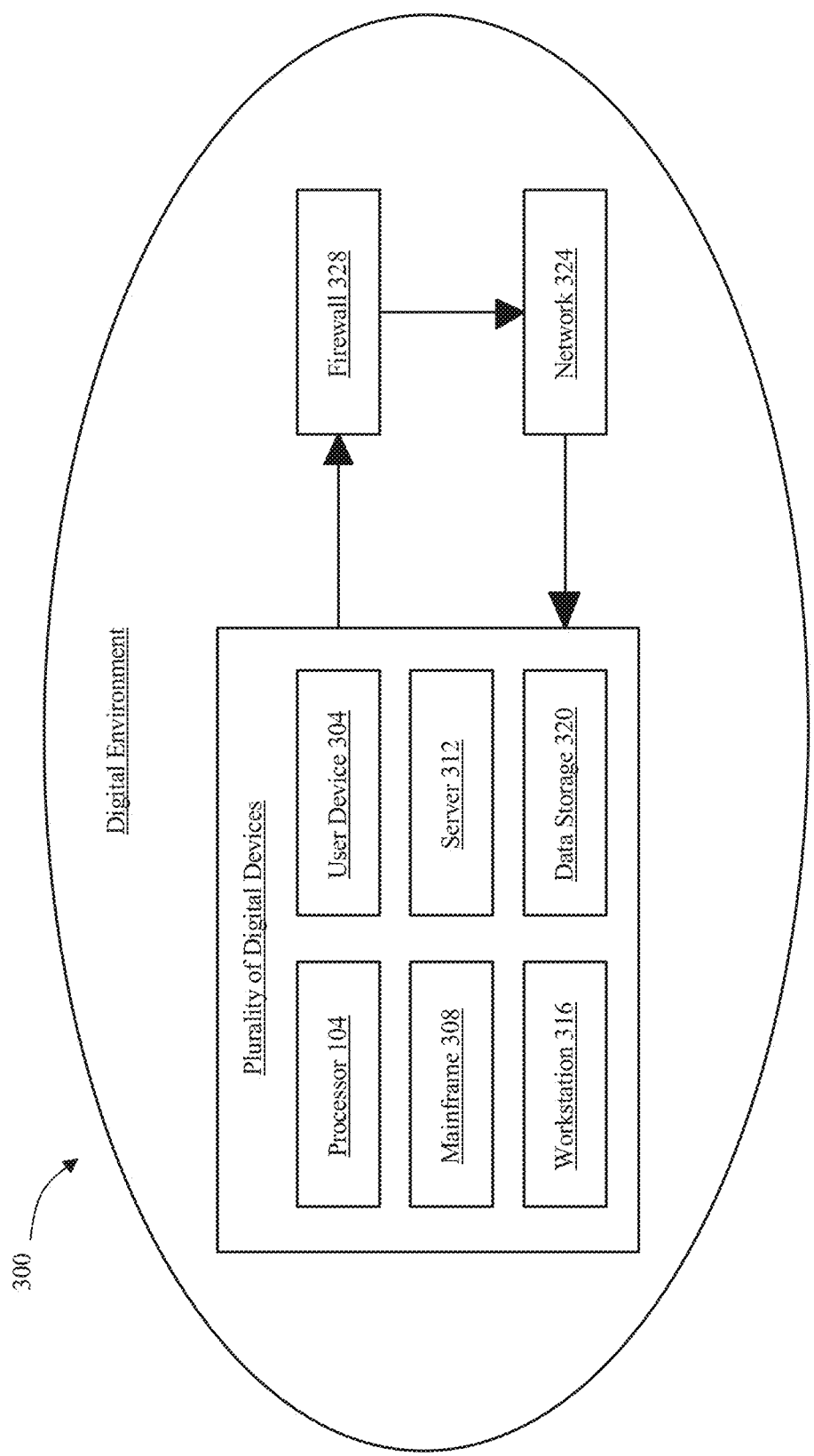
FIG. 3 is an exemplary embodiment of a digital environment.

Referring now to FIG. 3, an exemplary embodiment of a digital environment 300 is illustrated. Any processing step described in this disclosure may be performed in digital environment 300. In a non-limiting example, processor 104 may be included in digital environment 300. Digital environment 300 may include a plurality of digital devices 304. Plurality of digital device may include computing device as described in this disclosure; for instance, and without limitation, processor 104 may be a digital device within digital environment 300. In some embodiments, plurality of digital device may include a user device 304. User device 304 may include, without limitation, any mobile device, laptop, desktop computer, and the like thereof. In some embodiments, user device 304 may be operated by entity in a remote location. In some embodiments, digital devices may include one or more mainframes 308, wherein the mainframe is a computing device used primarily by large organizations for critical applications such as bulk data processing for tasks such as censuses, industry and consumer statistics, enterprise resource planning, large-scale transaction processing, and the like thereof. In some embodiments, digital devices may include one or more servers 312, wherein the server is a piece of computing device or computer program that provides functionality for other programs or digital devices, such as, without limitation, user device 304. In some cases, one or more servers 312 may include, without limitation, database server, file server, mail server, print server, web server, application server, and the like thereof. In some embodiments, digital devices may include one or more workstations 316, wherein the workstation is a special computing device designed for technical or scientific applications which intended to be used by a single entity. One or more workstation 316 may be configured to run multi-user operating systems. In some cases, one or more workstations may include one or more thin-client workstation which is configured to perform its functions, or any processing steps described in this disclosure mostly remotely; for instance, and without limitation, through one or more servers 312. In other cases, one or more workstations 316 may include one or more thick-client workstation which is configured to perform its functions, or any processing steps described in this disclosure mostly locally; for instance, and without limitation, using one or more thick-client workstation itself and local computational power, independent from one or more servers 312. In some embodiments, digital devices may include one or more data storages 320; for instance, and without limitation, digital environment 300 may include a data center, wherein the data center may include a plurality of computing devices with storage systems configured to store and/or manage data of entity within digital environment 300. Persons skilled in the art, upon reading the entirety of this disclosure, will be aware of various digital devices listed above and other potential digital devices for purposes described herein.

With continued reference to FIG. 3, in some embodiments, digital environment 300 may include one or more networks 324. Network 324 may include a computer network containing one or more data connections between one or more network nodes. In some embodiments, network may include, without limitation, personal area network (PAN), local area network (LAN), mobile ad hoc network (MANET), metropolitan area network (MAN), wide area network (WAN), cellular network, global area network (GAN), space network, and the like. In some embodiments, data connections between one or more network nodes may include one or more wire connection between a first network node and a second network node. In other embodiments, data connections between one or more network nodes may include one or more wireless connections between a first network node and a second network node. As used in this disclosure, a "network node" is a node as a redistribution point in network 324. In an embodiment, network node may include a communication endpoint within digital environment 300. In a non-limiting example, plurality of digital devices may transmit one or more network packet between each other and/or networks 324 within digital environment 300 through one or more data connections, wherein the network packet is a unit of data that transfer over network 324. In some cases, network packet may include, but is not limited to, packet header, payload, signature, transferred data, and the like. In some embodiments, network 324 may include an open systems interconnection (OSI) model, wherein the open systems interconnection model further organized a plurality of functions of data communications by segregating the plurality of functions into a plurality of layers. In some cases, layers may include, without limitation, application layer, presentation layer, session layer, transport layer, network layer, data link layer, physical layer, and the like.

Still referring to FIG. 3, in some embodiments, network 324 may include, participate in, and/or be incorporated in a network topology. A "network topology" as used in this disclosure is an arrangement of elements of a communication network. In some embodiments, network 324 may include, but is not limited to, a star network, tree network, and/or a mesh network. A "mesh network" as used in this disclosure is a local network topology in which the infrastructure nodes connect directly, dynamically, and non-hierarchically to as many other nodes as possible. Network nodes may be configured to communicate in a partial mesh network. A partial mesh network may include a communication system in which some nodes may be connected directly to one another while other nodes may need to connect to at least another node to reach a third node. In some embodiments, network 324 may be configured to communicate in a full mesh network. A full mesh network may include a communication system in which every network node in network 324 may communicate directly to one another. In some embodiments, network 324 may include a layered data network. As used in this disclosure a "layered data network" is a data network with a plurality of substantially independent communication layers with each configured to allow for data transfer over predetermined bandwidths and frequencies. As used in this disclosure a "layer" is a distinct and independent functional and procedural tool of transferring data from one location to another. For example, and without limitation, one layer may transmit communication data at a particular frequency range while another layer may transmit communication data at another frequency range such that there is substantially no crosstalk between the two layers which advantageously provides a redundancy and safeguard in the event of a disruption in the operation of one of the layers. A layer may be an abstraction which is not tangible.

Continuing referring to FIG. 3, in some embodiments, digital environment 300 may include plurality of digital devices related to one or more networks 324. In a non-limiting example, digital devices may include a network bridge, wherein the network bridge is a computer networking device that aggregates network from a plurality of networks. In another non-limiting example, digital devices may include a network switch, wherein the network switch is a computer networking device responsible for connecting one or more digital devices on network 324 within digital environment 300. Network switch may connect one or more digital devices on network 324 using packet switching at data link layer of open systems interconnection model to receive and forward data in between connected digital devices. In other non-limiting example, digital devices may include a router, wherein the router is a device configured to forward network packet between one or more networks 324. In an embodiment, router may forward network packet from one network to another by processing the addressing or routing information included in packet header. Router may be connected with at least an access point (AP), wherein the at least an access point is a digital device that allows other digital devices to connect to the network 324 such as, without limitation, network node, communication endpoint, and the like thereof. Persons skilled in the art, upon reading the entirety of this disclosure, will be aware of various digital devices related to one or more networks 324 for purposes described herein.

With continued reference to FIG. 3, in some embodiments, digital environment 300 may include a firewall 328. As used in this disclosure, a "firewall" is a network component for securing the digital environment 300 and components within digital environment 300, such as, without limitation, plurality of digital devices, networks 324, connections between them, and the like thereof. In some embodiments, firewall 328 may be configured to control access rules of digital environment 300. In some cases, firewall 328 may be computer software running on a root network node within digital environment 300. In some embodiments, firewall 328 may be inserted in between plurality of data connections between digital devices and/or networks 324 within digital environment 300. In a non-limiting example, firewall may be configured to reject access request from unrecognized source. Firewall may also be configured to accept access request from recognized source. In another non-limiting example, firewall 328 may include a secure gateway. As used in this disclosure, a "secure gateway" is an on-premises and/or cloud-delivered network security service. In some embodiments, secure gateway may be disposed between entity and/or digital devices and network 324. Secure gateway may provide a network protection; for instance, and without limitation, secure gateway may be configured to inspecting an incoming web request against entity policy to ensure malicious activities are blocked and inaccessible from digital environment 300.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. Machine-learning process may use training data 404 to generate an algorithm that will be performed by processor 104/module to produce outputs 408 given data provided as inputs 413; this is in contrast to a non-machine learning software program where the commands to be executed are determined in advance by a user and written in a programming language. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, training data 404 may include plurality of digital asset sets or digital collections as input and plurality of digital asset maps as output.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
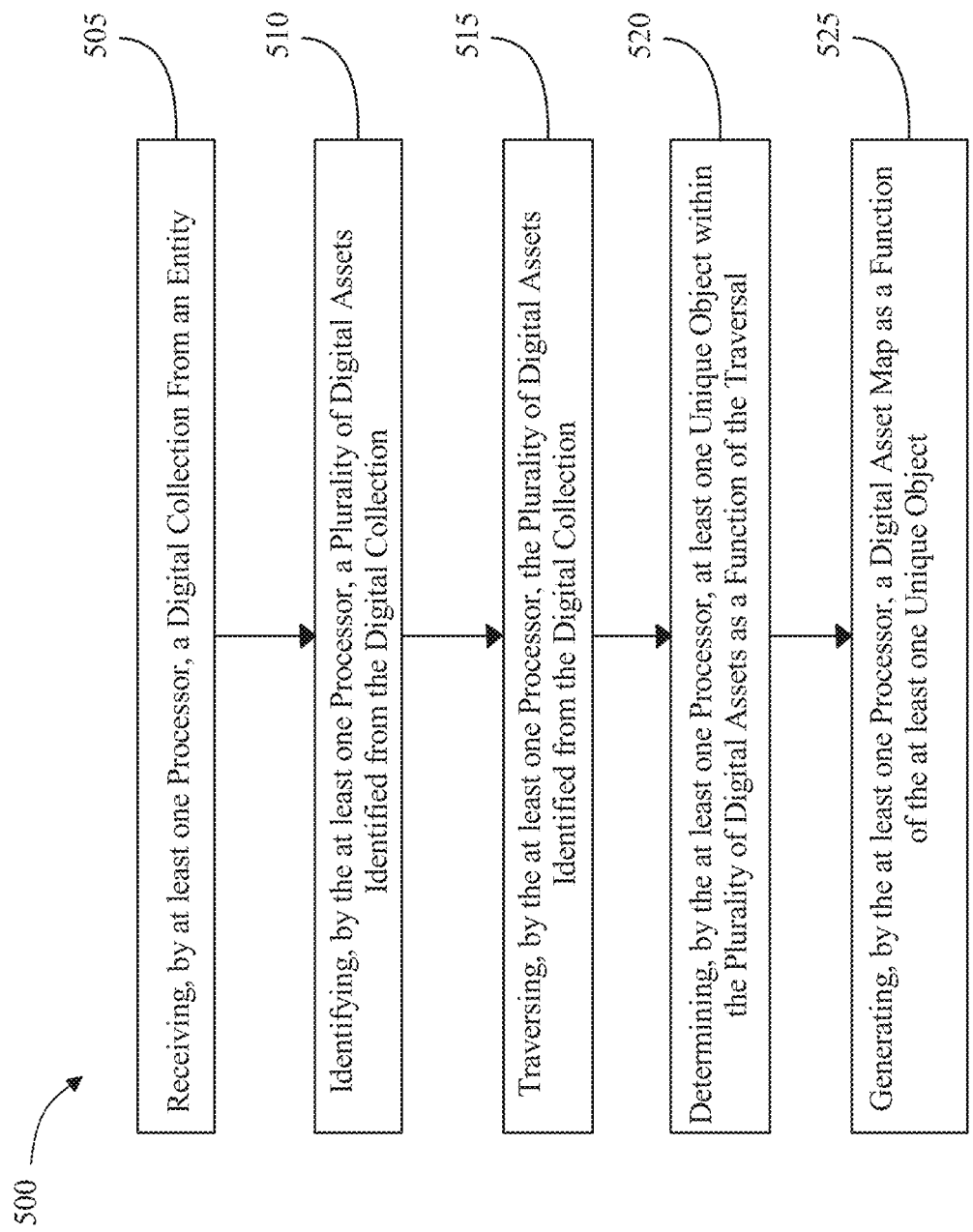
FIG. 5 is a flow diagram illustrating a method for digital asset map generation.

Now referring to FIG. 5, an exemplary embodiment of method 500 for digital assets map generation is illustrated. Method 500 includes step 505 of receiving, by at least one processor, a digital collection from an entity, without limitation, as described above in reference to FIGS. 1-4. In some embodiments, receiving the digital collection may include aggregating the plurality of digital assets related data and digital collection using an aggregator. This may be implemented, without limitation, as described above in reference to FIGS. 1-4.

With continued reference to FIG. 5, method 500 includes step 510 of identifying, by at least one processor, a plurality of digital asset from the digital collection. This may be implemented, without limitation, as described above in reference to FIGS. 1-4.

With continued reference to FIG. 5, method 500 includes step 515 of traversing, by the at least one processor, the plurality of digital assets identified from the digital collection. This may be implemented, without limitation, as described above in reference to FIGS. 1-4.

With continued reference to FIG. 5, method 500 includes a step 520 of determining, by the at least one processor, at least one unique object within the plurality of digital assets as a function of the traversal, without limitation, as described above in reference to FIGS. 1-4. In some embodiments, determining the at least one unique object may include flagging the at least one unique object. This may be implemented, without limitation, as described above in reference to FIGS. 1-4.

With continued reference to FIG. 5, method 500 includes step 525 of generating, by the at least one processor, a digital asset map as a function of the at least one unique object, without limitation, as described above in reference to FIGS. 1-4. In some embodiments, the digital asset map may include at least a node corresponding to at least one unique object within the plurality of digital assets. In some embodiments, the digital asset map may include a digital asset path, wherein the digital asset path may include an edge connecting a first node and a second node. In some embodiments, the digital asset path may include a bidirectional digital asset path containing at least one bidirectional edge. In other embodiments, the digital asset path may include a unidirectional digital asset path containing at least one unidirectional edge. This may be implemented, without limitation, as described above in reference to FIGS. 1-4. In some embodiments, generating the digital asset map may include linking at least one unique object to a user operation datum. In some embodiments, generating the digital asset map may include training a digital asset map machine-learning model using digital collection training data, wherein the digital collection training data include a plurality of digital collections as input correlated to a plurality of digital asset maps as output and generating the digital asset map using the digital asset map machine-learning model. Additionally, or alternatively, generating the digital asset map may include displaying the digital asset map through a visual interface. This may be implemented, without limitation, as described above in reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
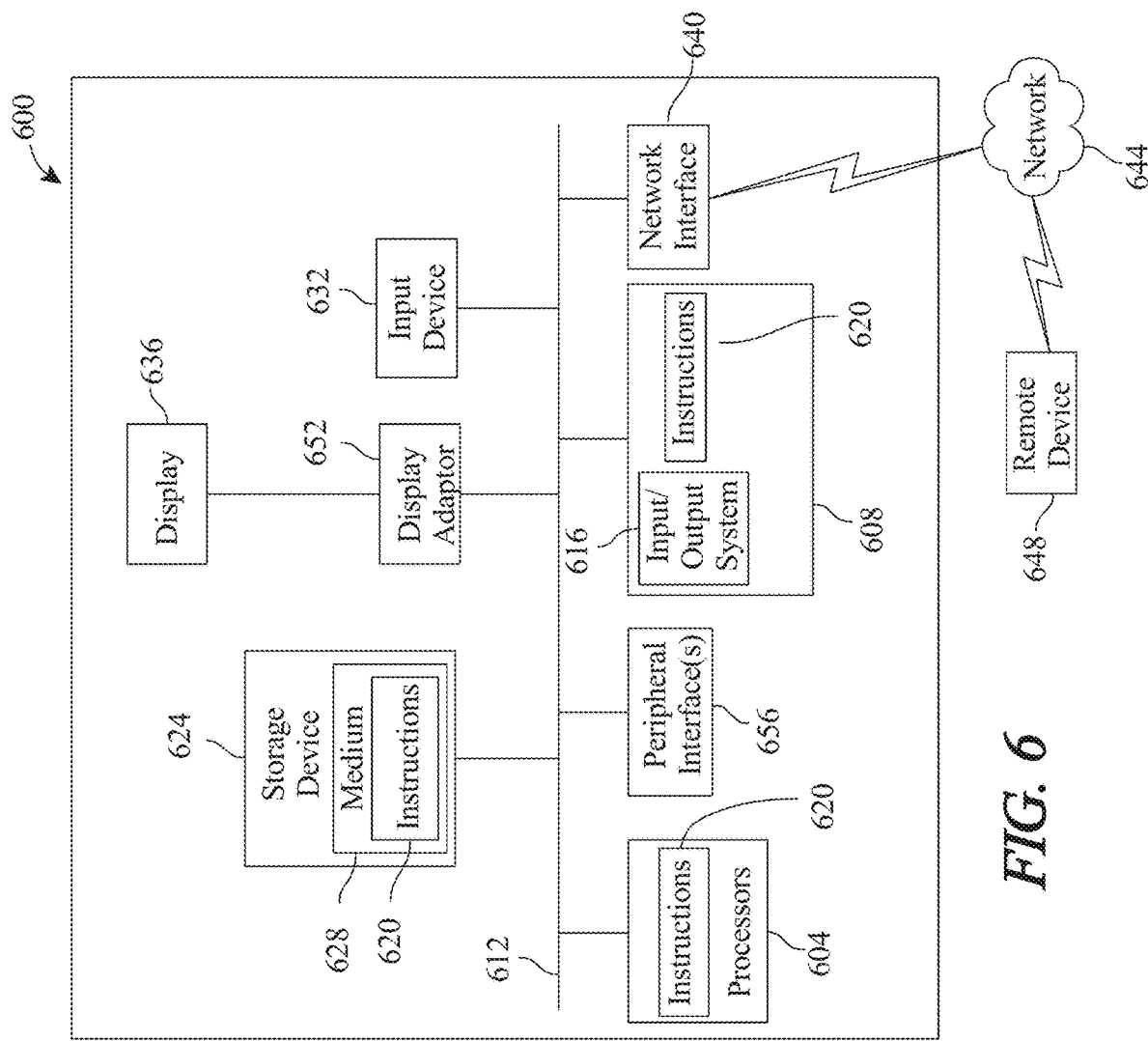
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for digital assets map generation, the apparatus comprises:
   a digital environment communicatively connecting a plurality of digital devices, wherein the digital environment comprises a firewall inserted in between a plurality of data connections between the plurality of digital devices wherein the firewall is configured to control access rules of the digital environment;
   at least one processor operating in the digital environment; and
   a memory communicatively connected to the at least one processor, wherein the memory contains instructions configuring the at least one processor to:
      receive a digital collection from an entity;
      identify a plurality of digital assets from the digital collection;
      traverse the plurality of digital assets identified from the digital collection, wherein traversing further comprises identifying at least a data path connecting the plurality of digital assets;
      determine at least one unique object within the plurality of digital assets as a function of the traversal;
      train a digital asset map machine learning model, wherein training a digital asset map machine learning model comprises:
         applying digital asset training data to an input layer of nodes comprising an input layer of nodes comprising a plurality of digital assert set inputs, an intermediate layer of nodes, and at least an output layer of nodes comprising a plurality of digital assert map outputs;
         adjusting one or more connections and one or more weights between nodes in adjacent layers of the digital asset map machine learning model;
         detecting additional correlations between the output layer of nodes and the input layer of nodes;
         retraining the digital asset map machine learning model as a function of the additional correlations; and
      generate a digital asset map as a function of the trained digital asset map machine learning model and the at least one unique object, wherein the digital asset map comprises:
         a plurality of nodes further comprising:
            root nodes;
            intermediate nodes; and
            terminal nodes;
         a plurality of edges connected between all the root nodes, terminal nodes, and intermediate nodes, wherein an edge of the plurality of edges comprises a ring edge with a direction that points back towards a terminal node; and
         a plurality of digital assets paths, wherein each digital asset path comprises:
      a complete path from root nodes to terminal nodes; and
      nodes traversal based on the plurality of edges connected in between the nodes; and
         display the generated digital asset map using a visual interface, wherein each node of the plurality of nodes comprises an interaction component configured to access a user operation datum and the at least one unique object linked to the user operation datum.

2. The apparatus of claim 1, wherein receiving the digital collection comprises aggregating the plurality of digital assets related data and digital collection using an aggregator.

3. The apparatus of claim 1, wherein determining the at least one unique object comprises flagging the at least one unique object.

4. The apparatus of claim 1, wherein the digital asset map comprises at least a node corresponding to the at least one unique object within the plurality of digital assets.

5. The apparatus of claim 1, wherein the digital asset path comprises a bidirectional digital asset path comprising at least one bidirectional edge.

6. The apparatus of claim 1, wherein the digital asset path comprises a unidirectional digital asset path comprising at least one unidirectional edge.

7. The apparatus of claim 1, wherein generating the digital asset map comprises:
   linking the at least one unique object to a user operation datum.

8. The apparatus of claim 1, wherein generating the digital asset map comprises displaying the digital asset map through a visual interface.

9. A method for digital assets map generation, the method comprises:
   receiving, by at least one processor, a digital collection from an entity;
   identifying, by the at least one processor operating in a digital environment, a plurality of digital asset from the digital collection, wherein the digital environment communicatively connects a plurality of digital devices, wherein the digital environment comprises a firewall inserted in between a plurality of data connections between the plurality of digital devices wherein the firewall is configured to control access rules of the digital environment;

traversing, by the at least one processor, the plurality of digital assets identified from the digital collection, wherein traversing further comprises identifying at least a data path connecting the plurality of digital assets;

determining, by the at least one processor, at least one unique object within the plurality of digital assets as a function of the traversal;

training, by the at least a processor, a digital asset map machine learning model, wherein training a digital asset map machine learning model comprises:

applying digital asset training data to an input layer of nodes comprising an input layer of nodes comprising a plurality of digital assert set inputs, an intermediate layer of nodes, and at least an output layer of nodes comprising a plurality of digital asset map outputs;

adjusting one or more connections and one or more weights between nodes in adjacent layers of the digital asset map machine learning model;

detecting additional correlations between the output layer of nodes and the input layer of nodes;

retraining the digital asset map machine learning model as a function of the additional correlations; and generating, by the at least one processor, a digital asset map as a function of the trained digital asset map machine learning model and the at least one unique object, wherein the digital asset map comprises:

a plurality of nodes further comprising:
  root nodes;
  intermediate nodes; and
  terminal nodes;

a plurality of edges connected between all the root nodes, terminal nodes, and intermediate nodes, wherein an edge of the plurality of edges comprises a ring edge with a direction that points back towards a terminal node; and a plurality of digital assets paths, wherein each digital asset path comprises:
  a complete path from root nodes to terminal nodes; and
  nodes traversal based on the plurality of edges connected in between the nodes; and displaying, by the visual interface, the generated digital asset map, wherein each node of the plurality of nodes comprises an interaction component configured to access a user operation datum and the at least one unique object linked to the user operation datum.

10. The method of claim 9, wherein receiving the digital collection comprises aggregating the plurality of digital assets related data and digital collection using an aggregator.

11. The method of claim 9, wherein determining the at least one unique object comprises flagging the at least one unique object.

12. The method of claim 9, wherein the digital asset map comprises at least a node corresponding to the at least one unique object within the plurality of digital assets.

13. The method of claim 9, wherein the digital asset path comprises a bidirectional digital asset path comprising at least one bidirectional edge.

14. The method of claim 9, wherein the digital asset path comprises a unidirectional digital asset path comprising at least one unidirectional edge.

15. The method of claim 9, wherein generating the digital asset map comprises:
linking the at least one unique object to a user operation datum.

16. The method of claim 9, wherein generating the digital asset map comprises displaying the digital asset map through a visual interface.

* * * * *